Jan. 3, 1928.
E. W. SEAHOLM
VEHICLE BRAKE
Filed July 11, 1924
1,655,166
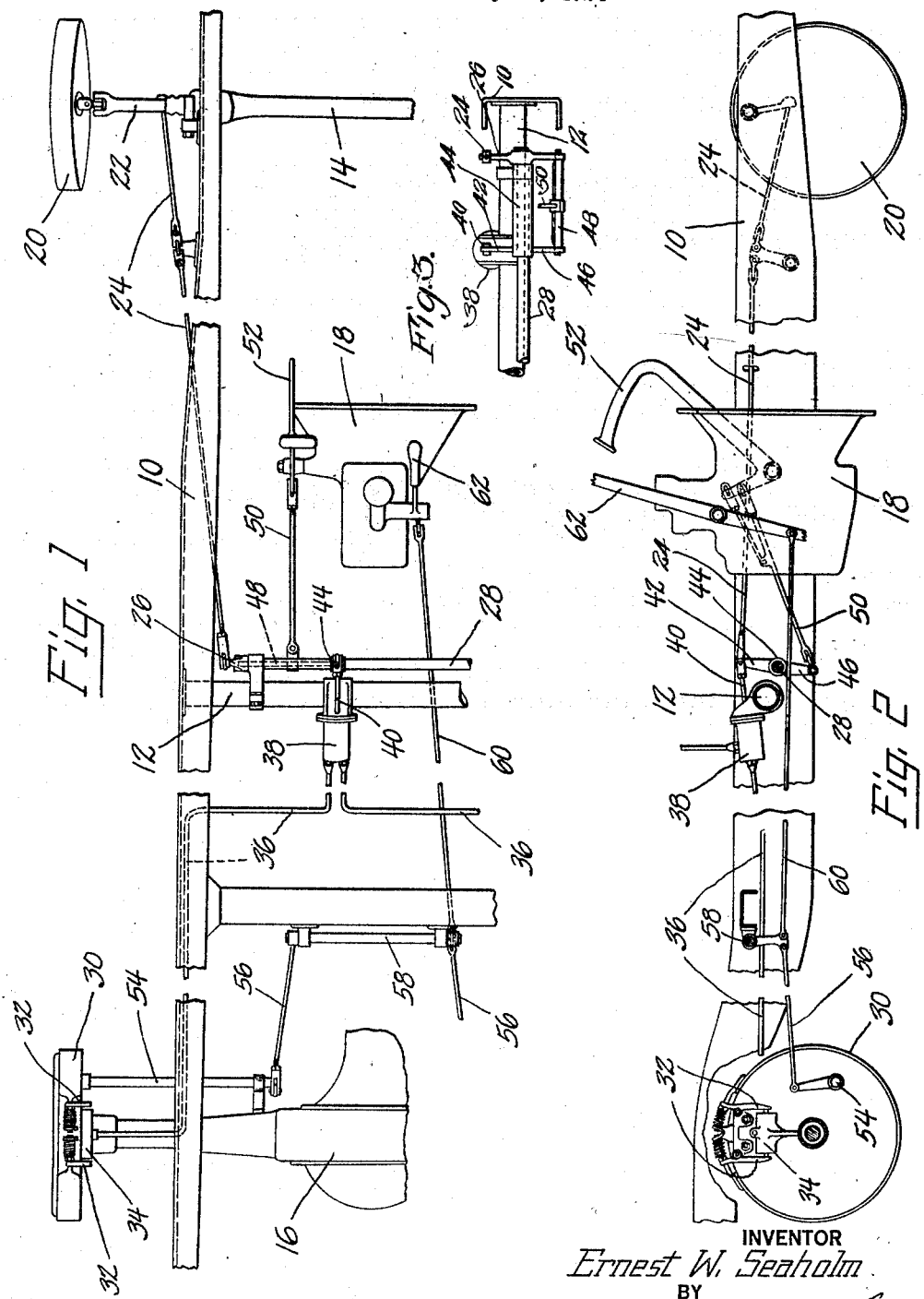
INVENTOR
*Ernest W. Seaholm*
BY
*Blackmore, Spencer & Flint*
ATTORNEYS Patented Jan. 3, 1928.

1,655,166

UNITED STATES PATENT OFFICE.

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE.

VEHICLE BRAKE.

Application filed July 11, 1924. Serial No. 725,425.

This invention relates to brakes for vehicles, and is illustrated as embodied in a Cadillac automobile having common operating means for a mechanically-operated set of brakes and for a power cylinder and piston of a set of hydraulic or other fluid power brakes. By an arrangement of this character it is feasible to secure the ease of operation of the fluid-operated brakes while still having a set of mechanically-operated brakes as a reserve of safety in case of leakage or breakage in the fluid connections. If the mechanically-operated brakes are on the front wheels, it is also possible to have one of them release on a turn, to avoid any possibility of loss of steering control due to the locking of both front wheels. Preferably the service brake pedal operates an equalizer bar connected at one end to the mechanical brake-operating connections, and at its other end to the power piston of the fluid power connections.

The above and other features of the invention, including a desirable and efficient arrangement of the operating parts, will be apparent from the following description of one illustrative embodiment shown in the accompanying drawings, in which:

Figure 1 is a diagrammatic top plan view of part of the chassis of an automobile having the described brakes.

Figure 2 is a view partly in vertical section and partly in side elevation, of the same chassis.

Figure 3 is a fragmentary view showing certain equalizing mechanism present in my invention.

In the arrangement selected for illustration, a chassis frame 10 having a cross member 12 is supported by the usual springs on a front axle 14 and a rear axle 16. The transmission is shown at 18.

On the front wheels are brakes 20 operated by flexible shafts 22 connected by links 24 to arms 26 on opposite ends of a rockshaft 28.

On the rear wheels are external brakes 30 contracted by levers 32 operated by pistons in hydraulic cylinders 34. The hydraulic or equivalent fluid power connections include conduits 36 leading from a master cylinder 38 carried by cross member 12, there being in the master cylinder a power piston operated by a connecting rod 40 leading from an operating arm 42 on a sleeve 44 journaled on the rockshaft 28.

An operating arm 46 depending from sleeve 44, and a parallel operating arm on the end of shaft 28 extending downwardly from arm 26, are connected to opposite ends of an equalizer bar 48 connected at an intermediate point by a link 50 to the service brake pedal 52.

The emergency brakes are operated by shafts 54 connected by links 56 to arms on a rockshaft 58 having a link 60 connecting it to the emergency brake lever 62.

By the above-described arrangement, depression of pedal 52 acts through equalizer 48 to rock shaft 28, applying the front brakes 20, and also to push connecting rod 40 to apply fluid power to the rear brakes. In case the rear brakes become inoperative by reason of loss of the power fluid, e. g. on account of leakage, when the power piston reaches the end of its stroke it serves as a fulcrum for the equalizer bar 48, permitting application of the front brakes on further depression of the pedal.

While one illustrative embodiment of the invention has been described in detail, it is not my invention to limit its scope to that particular embodiment, or otherwise than by the terms of the appended claims.

I claim:

1. A motor vehicle comprising, in combination, a set of two rear brakes, a set of two front brakes, a rock member and mechanical connections therefrom for operating one of said sets of brakes, a fluid pressure cylinder and piston and fluid power connections therefrom for operating the other set of brakes, equalizing means operatively connected with said rock member and with the piston aforesaid, and a driver operated member operatively connected with said equalizing means to thereby operate both sets of brakes.

2. A motor vehicle comprising, in combination, a set of two rear brakes, a set of two front brakes, a rock member and mechanical connections therefrom for operating one of said sets of brakes, a fluid pressure cylinder and piston and fluid power connections therefrom for operating the other set of brakes, an equalizer connected at one end to the rock member and at the other end to the piston, and a driver-operated lever connected to the equalizer.

3. A motor vehicle comprising, in combination, a set of rear brakes, a set of front brakes, a chassis frame having a cross member, a rock shaft paralleling the cross member and having an operating arm and which is connected at its opposite ends to the brakes of one set, a fluid pressure cylinder supported on the cross member, fluid power connections from the cylinder to the brakes of the other set, a piston in the cylinder, an operating arm for the piston paralleling the operating arm of the rockshaft, an equalizer bar connected at its opposite ends to the two operating arms, and a pedal connected to an intermediate part of the bar.

In testimony whereof I affix my signature.

ERNEST W. SEAHOLM.